United States Patent [19]
Baptist et al.

[11] Patent Number: 5,278,510
[45] Date of Patent: Jan. 11, 1994

[54] IONIZATION VACUUM GAUGE USING A COLD MICROPOINT CATHODE

[75] Inventors: Robert Baptist, Jarrie; Christophe Py, Grenoble, both of France

[73] Assignee: Commissariat a L'Energie Atomique, France

[21] Appl. No.: 917,484

[22] Filed: Jul. 20, 1992

[30] Foreign Application Priority Data

Jul. 23, 1991 [FR] France ............... 91 09283

[51] Int. Cl.$^5$ .......... G01L 21/34; G01N 27/70; H01J 1/30; H01J 19/24
[52] U.S. Cl. .................... 324/460; 313/309; 313/336
[58] Field of Search ........... 324/459, 460, 463, 464; 73/753; 313/309, 336

[56] References Cited

U.S. PATENT DOCUMENTS 4,857,161 8/1989 Borel et al. .
4,940,916 7/1990 Borel et al. .
5,103,145 4/1992 Doran .................. 313/309 X

FOREIGN PATENT DOCUMENTS 2593953 4/1988 France .
272178 6/1988 France .
2623013 5/1989 France .

OTHER PUBLICATIONS

*Discovery*, "Measuring vacuum by counting molecules", 1964 pp. 15-16.
*Physica Scripta.*, "Extreme Vacua: Achievements and Expectations", 1988, vol. T22, pp. 48-54.

Primary Examiner—Gerard P. Strecker
Attorney, Agent, or Firm—Pearne, Gordon, McCoy & Granger

[57] ABSTRACT

Ionization vacuum gauge comprising, like Bayard Alpert gauges, in a chamber (1) containing an extremely low pressure atmosphere, whose ultra-vacuum degree it is desired to be measured, an electron source cathode (2), a grid (3) for collecting these electrons and surrounding a collector (4) of ions resulting from the impact of the electrons on the gas molecules of the extremely low pressure atmosphere, wherein the electron source is a cold micropoint cathode.

8 Claims, 3 Drawing Sheets

IONIZATION VACUUM GAUGE USING A COLD MICROPOINT CATHODE

FIELD OF THE INVENTION

The present invention concerns an ionization vacuum gauge and generally the measurement of extremely low pressures in chambers where an ultra-vacuum exists (the ultra-vacuum including the ultra-vacuum extreme limit).

BACKGROUND OF THE INVENTION

The vacuum gauges used to this effect are known to be ionization gauges which measure the pressure of the ultra-vacuum from the density of the particles the ultra-vacuum atmosphere contains, said atmosphere being itself contained in a specific recipient. The known principle for functioning of these gauges consists of ionizing one proportion of the molecules and atoms of the gas constituting this atmosphere via impact with electrons derived from a source whose flowrate is known. The gas ions formed are then collected by a measuring electrode of the system and the ionic current obtained is an analogous measurement of the pressure of the ultra-vacuum existing in the chamber.

It is also known that the formation of said molecules takes place in two different ways. In ionization vacuum gauges, known as cold cathode or Penning gauges, the ions are formed in a maintained electric discharge and at high intensity in the presence of a homogeneous magnetic field. In another category of vacuum gauges, ionization is produced via the collision with electrons emitted by a heated filament, these ionization vacuum gauges being hot cathode ionization vacuum gauges. The present invention concerns a vacuum gauge derived from a type of hot cathode vacuum gauges known under the name of Bayard-Alpert vacuum gauges, reference firstly being made to the principle associated with FIG. 1 which describes a device of the prior art.

The Bayard-Alpert gauge described in FIG. 1, which is an exploded skeleton diagram, mainly includes a chamber 1 containing the ultra-vacuum atmosphere whose pressure is desired to be determined. This chamber 1 contains the three electrodes of the system, namely a hot cathode or filament 2 intended for the emission of a flow of electrons, an anode grid 3 and, along the axis of the chamber 1, an ions collector 4. In the example shown, the anode grid surrounds the collector which is disposed along the axis of the chamber 1, but this is not strictly the case for all Bayard-Alpert type gauges. This gauge operates at low voltage and in the absence of any magnetic field. The thermoelectronic electrons emitted by the cathode 2 are accelerated in the electric field created by the polarization of the anode 3 and acquire there sufficient energy so as to ionize the gas contained in the inter-electrode system. The positive ions created by impacts are attracted by the collector 4 found at a potential close to that of the chamber and the current thus produced makes it possible to measure the pressure. The electrons are finally captured by the anode 3 which most frequently appears in the form of a helical wire. The hot cathode is a highly productive source of electrons which enables high sensitivity to be obtained, particularly at extremely low pressure. Moreover, hot cathode gauges have, as compared with cold cathode gauges, a much weaker pumping effect by an order of magnitude.

The upper pressure limit able to be measured by this system is several $10^{-3}$ mbars; this is mainly due to the fact that, at higher pressures, electric arcs or luminous discharges may occur. The filament then may possibly burn. At lower pressures, the measurement is limited by two physical effects, namely:

the desorption effect of the anode under the influence of the electrons striking it. This effect is independent of the pressure but is proportional to the electronic emission current.

the Röntgen effect: when the electrons strike the anode, they free photons (soft X-radiation) which in turn create photoelectrons when striking various surfaces, including the collector. The photoelectrons freed by the collector flow to the anode, thus creating a current of the same direction as the ionic current. For Bayard-Alpert gauges, this effect becomes preponderant within the range of $10^{-10}$ mbars.

The hot cathode 2 is formed of a filament located outside the volume delimited by the grid. The electrons emitted by the cathode go backwards and forwards through the grid until they are trapped. By way of example, for a vacuum of $10^{-8}$ mbars and an electronic current of 1 mA, an ionic current of 10 pA is obtained (for a gauge factor of 10 mbars$^{-1}$).

The main defect of hot cathode gauges derives from the systematic use of a heating filament as a source of electrons.

This type of thermoelectronic source is in fact isotropic, whereas the directivity of the beam of electrons is an important parameter as regards gauge sensitivity. In fact, it has been shown that the average length of the electron trajectories is that much longer when the latter are radial, that is directed towards the collector 4, and it is known that the probability of ionization of the gas inside the zone delimited by the grid 3 is directly proportional to this average length (the ionization probability increases with the length). It is solely to the extent that the field is fully homogeneous around the filament 2 that the beam is reconcentrated by the grid; this is why the sensitivity of the guage is highly dependent on the position of the filament 2, which in addition may move during the time period or sag under the effect of the heat (about 2000° C.), all the more so when the electrons emitted by the filament leave the latter with a kinetic energy of almost nil and without directivity. Similarly, the fact that the source is relatively extended and that all its points do not emit in a similar way renders it more difficult to reconcentrate the beam of electrons and adversely affects its regularity. These two reasons mean that the sensitivity of the gauge is time-unstable parameter and to a certain extent cannot be reproduced. In addition, the electron emission phenomenon is originally thermic and costly in energy terms, has an extremely long response time and, in certain applications, is a significant pollutive factor.

Another concept for measuring the vacuum is described in the British review "Discovery", vol. 25, No 10, October 1964, p.15–16.

This structure, able to measure vacuum absolutes, uses the emission of electrons by tungsten points, with a diameter of several thousands of Angström units, used as emissive cathodes and comprising the cut extremity of macroscopic metallic rods, similar to nails. These macropoints and a polarized anode are placed in the chamber where it is desired to measure the vacuum degree. An electric current is thus established between the points constituting the cathode and the polarized anode. The recommended method consists of measuring the fluctuations of this current due to the gas atoms which are fixed to the points and are regarded as representative of the number of atoms present in the chamber, that is ultimately of the pressure. Apart from the fact that, at extremely low pressure, a large amount of time (several hours) is required to be able to correctly measure the pressure, such a system is difficult to use owing to the high instability of the cathodic source established.

SUMMARY OF THE INVENTION

The present invention concerns an ionization vacuum gauge derived from Bayard-Alpert type gauges and is able to simply resolve said drawbacks.

This ionization vacuum gauge is mainly characterized in that the source of electrons is a cold micropoint cathode.

As shall be seen subsequently, the fact of replacing the heating filament with a cold micropoint cathode of the type with emission via a field effect does not imply that the ionization vacuum gauge of the invention forms part of the category of cold cathode gauges. As mentioned earlier, this denomination is normally reserved for Penning gauges which are relatively resistant, less sensitive and function according to a totally different emission principle (electric discharge in a magnetic field).

Cold micropoint cathodes are of a type fully known concerning the technique and production of electrons via a field effect from emissive micropoint cathodes and are fully described in, for example, the French patents No. 2.593.953 and 2.623.013 and corresponding U.S. Pat. Nos. 4,857,161 and 4,940,916.

When the invention is implemented in a basic structure of the Bayard-Alpert type gauge, the filament is replaced by a micropoint cathode having, for example, a width of 1 mm and sufficient height so that the emissive surface allows a current to be obtained comparable to the one available with a filament. Knowing that the average emissivity of a micropoint cathode is 1 $mA/mm^2$, a height of several centimeters is adequate to obtain a significant emission level.

The cathode is disposed in such a way that the micropoints are opposite the collector so that emission is clearly radial. Its distance with respect to the grid is calculated so that it interferes as little as possible with the field existing between the anode grid and the vacuum chamber, generally connected to the ground, and inside which the gauge is mounted.

The use of a cold micropoint cathode, which is an eminently directive source of electrons, thus makes it possible, by orientating it correctly in the direction of the anode and the ions collector, to be freed of the afore-mentioned drawbacks derived from the isotropic nature of the emission of a hot cathode in the form of a filament.

Technicians in the field concerning vacuum gauges did not understand why a filament could be replaced by a micropoint cathode. In fact, technicians are generally ignorant of developments relating to micropoints, either because these micropoints are used in display (screens) or are physically used on surfaces (tunnel microscopy). An article by C. Benventuri (Extreme Vacua: Achievement and Expectations, Physica Stripta, vol. T22, pages 48-54, 1988), a specialist in vacuums at the CERN advocated the use of hot filaments, and also recognized "cold" gauges as a possible alternative without envisaging the use of micropoint cathodes, known as Spindt devices since the 1970s.

A second important point concerning the novelty of the invention is the following: everyone, or nearly everyone, believes that it is necessary to have an extremely good vacuum (better than $10^{-8}$ bars) so that the micropoints are able to emit an electronic current via the field effect in a durable and stable way. In other words, nobody envisaged using field effect micropoints in a pressure range of about between $10^{-6}$ to $10^{-3}$ mbars (to properly measure this pressure). Now, the gauge of the invention has no limits differing from those of a conventional Bayard-Alpert gauge, that is it can be made to function over a range from between $10^{-3}$ and $10^{-11}$ mbars, indeed from $10^{-2}$ mbars.

Furthermore, the directivity of the electronic beam derived from a micropoint cathode depends on several parameters, including the form and size of the extraction grid, as well as the cathode/anode geometry (in the invention, it is the spirally-wound grid which acts as an anode). As the sensitivity of a vacuum gauge is directly dependent on the trajectories followed by the electrons, it was not clear that the fact of replacing the filament by a micropoint cathode retains or even improves sensitivity. This has only been able to be verified after simulation and experimentation. In the case where sensitivity would have decreased by a factor of 2, the advantage of using such a gauge would have been questionable. Currently, sensitivity is at least 1.5 times better.

The invention thus uses a micropoint cathode which may be matrix cathode with n cathodic electrodes (n being a whole number so that $n \geq 1$) disposed along lines or rows and feeding micropoints and m extracting grids (m being a whole number so that $m \geq 1$) disposed along columns and isolated from the cathodic electrodes.

If several cathodic electrodes are used, this redundancy makes it possible to still have an emission of electrons, even if some of these electrodes are out of operation.

The source of electrons used may be an emissive micropoint cathode of any type, such as the one described in the document FR-A-87 15432 (now FR 2623013 and U.S. Pat. No. 4,940,016). However, so as to obtain a relatively time-stable beam of electrons, which is extremely important for reliability of the measurement, it is specially advantageous to select a micropoint cathode provided with a resistive film, as described in the document FR-A-87 15432. This resistive film inserted between the cathodic electrodes and the actual micropoints thus plays the role of a buffer resistance and makes it possible to associate with each micropoint a particular resistance, thus resulting in obtaining extremely good homogenization of electronic emission.

According to the invention, the resistive film may be selected from a material in the group including indium oxide, tin oxide, iron oxide and doped silicon.

One of the additional advantages of the use of an emissive micropoint cathode resides in the fact that all the materials constituting such a cathode, for example glass, molybdene, silica, ITO (Indium tin oxide) are compatible with use in an ultra-vacuum. Note also that if the cathode is deposited on a silicon substrate, the baking temperature could increase (required for the embodiment of the ultra-vacuum) up to 600° C., which would be impossible on a glass substrate. However, as most bakings do not exceed 350° C., the question does not arise most of the time.

The cathodic electrodes are preferably carried to a potential Vc, the extraction grids to a potential Vg and the anode grid to a potential Va so that the electrons emitted by the source all have an initial kinetic energy equal to $-e \cdot (Vg-Vc)$ ranging from a minimum value required for extraction of the electrons to a maximum value less than or equal to $-e \cdot (Va-Vc)$, e being the electron charge.

The use of electrons possessing such initial energies allows for good sensitivity of the vacuum gauge, having regard to the fact that the major part of the electrons are not trapped when they first pass through the grid, contrary to the case of electrons emitted with an almost nil energy through the heating filaments.

Preferably, the ratio of the distances between firstly the extraction grids and the chamber and secondly the anode grid and the chamber is equal to the ratio of voltages between firstly the extraction grids and the chamber and secondly the anode grid and the chamber.

This equality makes it possible to obtain a field whose norm is homogeneous inside the vacuum gauge between the anode grid and the chamber.

The invention also concerns an ionization vacuum gauge comprising an emissive micropoint cathode source of electrons, one anode grid for collecting these electrons and an ion collector, wherein it further comprises:

- one first d.c. power unit to positively polarize at Vc the cathodic electrodes of the electron source with respect to the chamber,
- one second d.c. power unit for polarizing at Vg the electron extraction grids to a variable positive potential with respect to the cathodic electrodes,
- one third d.c. power unit for positively polarizing at Va the electron collecting anode grid with respect to the electron extraction grid, said three power units being connected in series between the chamber and the electron collection anode grid,
- one first current measuring device mounted between the second and third power units for measuring the electronic current,
- a second current measuring device mounted between the ions collector and the chamber so as to measure the ionic current,
- processing means connected to the first and second current measuring devices so as to calculate the pressure of the ultra-vacuum existing in the chamber on the basis of the read values of the electronic current and the ionic current.

The current measuring means are ammeters, for example.

According to one particularly advantageous embodiment of the vacuum gauge of the invention, this gauge further comprises a circuit for synchronization of the second power unit which may then be pulsed and two current measuring means, also able to be pulsed, so as to embody the functioning of the device according to a time-sampling mode.

This synchronization circuit then allows for intermittent functioning according to a time-pulsed sampling mode.

Figure 3:
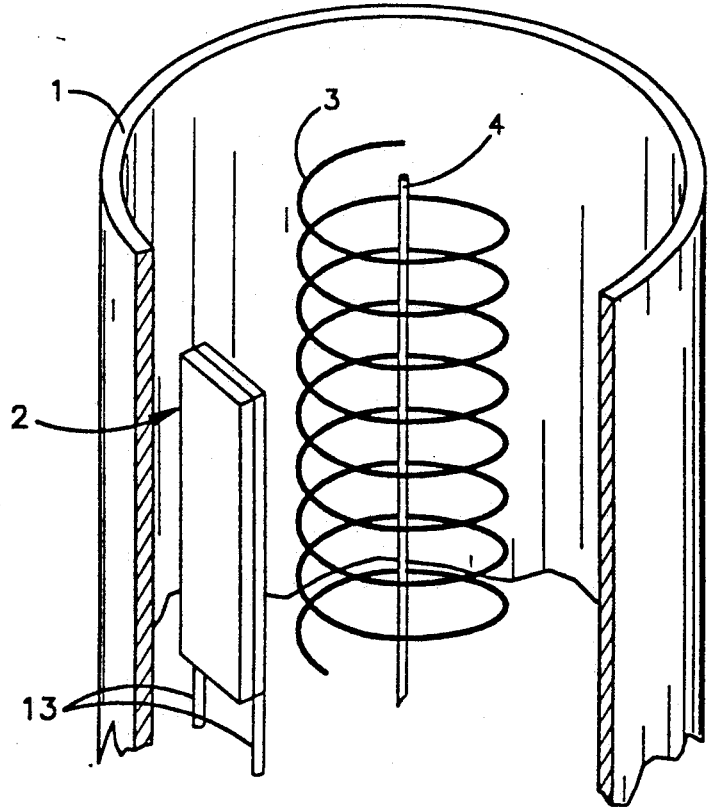
Figure 2:
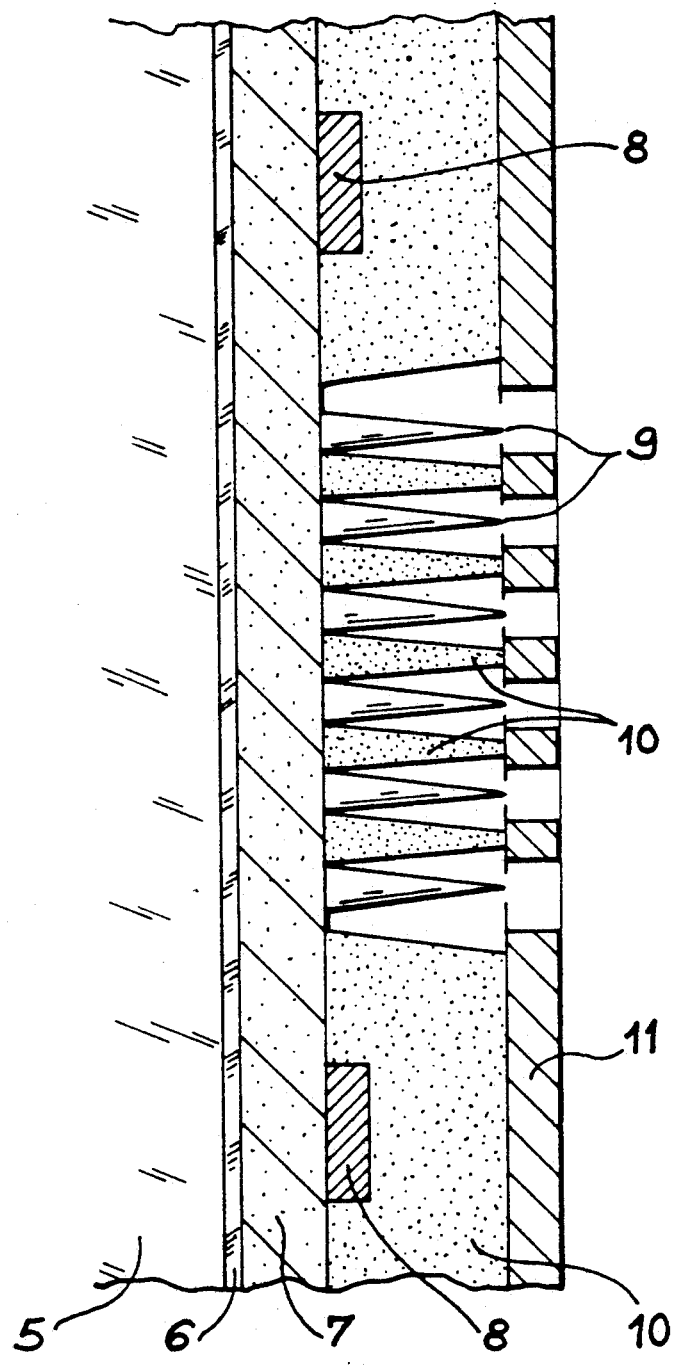
Figure 4:
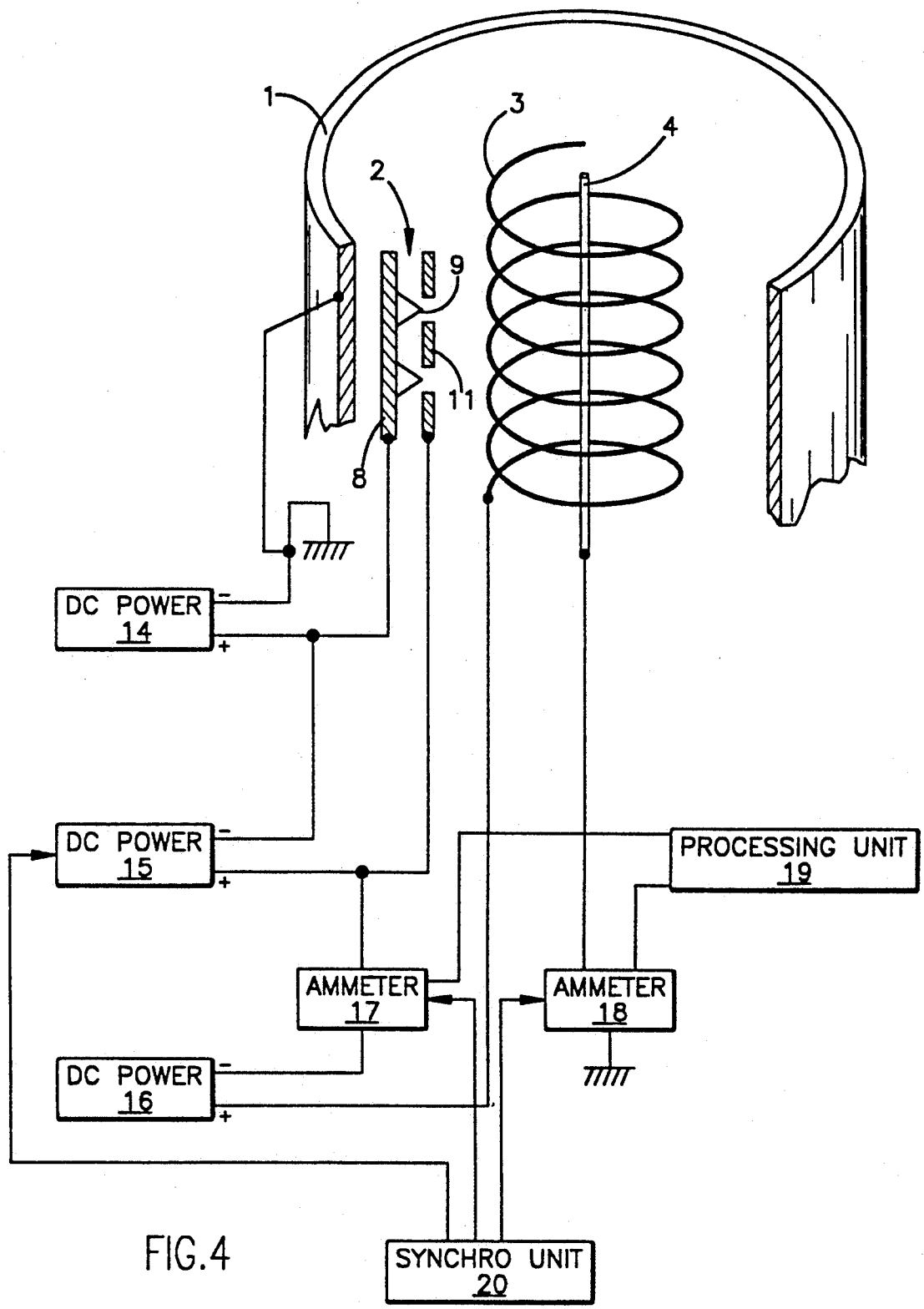

The invention shall be more readily understood by referring to the description of embodiments given by way of non-restrictive examples, together with reference to FIGS. 2 to 4:

FIG. 2 is a diagram of one preferential embodiment of an emissive micropoint cathode used in the vacuum gauge of the invention, FIG. 3 is a general skeleton diagram of the ionization vacuum gauge of the invention, FIG. 4 is a general diagram of the practical mounting of the vacuum gauge of FIG. 3 together with its feeding and signal processing means.

DETAILED DESCRIPTION OF THE PREFERRED EMBODIMENTS

The field effect emissive cathode of FIG. 2 mainly includes on a substrate 5 a silica film 6 coated with a resistive film 7. Situated on the resistive film 7 are n cathodic electrodes 8 (with n being a whole number so that $n \geq 1$) intended for feeding of the micropoints 9. A nonconducting film 10 separates the cathodic electrodes 8 from m electron extraction grid electrodes 11 (with m a whole number so that $m \geq 1$). The electron extraction grids 11 are open-worked above each micropoint 9 so as to allow for the emission of the electrons.

The advantage of the resistive film 7 concerning the homogenization of the flux of electrons has already been explained earlier.

Figure 1:
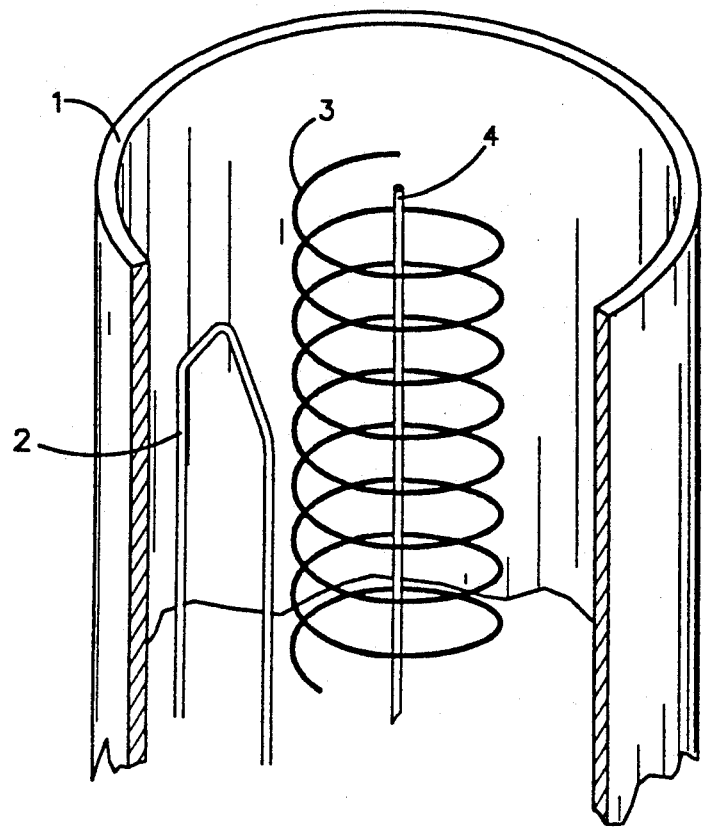
FIG. 1, previously discussed, shows a Bayard-Alpert gauge according to the prior art.

With reference now to FIG. 3, which is a general diagram of the ionization vacuum gauge of the invention, as in FIG. 1, this figure shows the vacuum chamber 1, the emissive cathode 2, the anode grid 3 and the ions collector 4. However and in accordance with the invention, the emissive cathode 2 is no longer a heating filament but a micropoint cathode conforming to the diagram of FIG. 2 and whose primary emission direction is situated towards the anode grid 3 and the ions collector 4.

So that the electrons are not trapped by the large surface of the chamber, the reference potential Vc (potential of the micropoints or of the cathodic electrodes) from which the electrons are emitted is greater than the potential (Ve) of the chamber. A standard value of Vc-Ve is, for example, 45 V for a grounded chamber.

The extraction grids 11 are then polarized at a variable voltage (Vg-Vc) with respect to the cathodic electrodes according to the extraction intensity it is desired to obtain. It is possible to have a mean voltage of about 90 V, which means polarizing the extraction grids 11 at a voltage Vg-Ve of 135 V with respect to the chamber, generally earthed or grounded It has been demonstrated that the probability of collision of the electrons with the gas atoms and molecules according to their energy passes through a maximum which for most gases is between 100 and 150 eV. This is why it is advantageous to polarize the anode grid 3 at a potential (Va-Vc) equal to 130 V with respect to the cathodic electrodes 8, that is to 175 V with respect to the chamber 1.

The ratio of the chamber 1-extraction grid 11 distances to the chamber 1-anode grid 3 shall then be almost 135/175.

More generally, one could say that the ratios of the chamber 1-extraction grid 11/chamber 1-anode grid 3 distances and voltages should be equal. This precaution needs to be taken as any discontinuity of the field tends to increase the kinetic moment of the electrons subjected to it and thus tends to divert them from a strictly radial trajectory, as explained earlier.

The collector 4 is a vertical wire centered in this embodiment on the axis of the gauge, this situation not always being the case. The anode grid may be a wire helical-wound around the collector 4; for a Bayard-Alpert gauge mounted on a conventional flange, it generally has a diameter of 20 mm, a height of several centimeters (between 2 and 5) and with a pitch of several millimeters (10 to 20 spires). The distance separating the grid 3 from the micropoint cathode 2 shall then, along with the previously given potential values, be 1.7 mm. The use of a micropoint cathode makes it possible to increase the internal volume of the grid 3 with respect to a conventional gauge and thus the probability of ionizing the residual gas. This volume increase is possible owing to the possibility of bringing together the micropoint cathode which, as opposed to filaments, does not heat.

The micropoint cathode may be fixed directly with the aid of rigid electric contacts 13, which also permit voltage to be supplied. Fixing may be effected by welding with contact blocks etched on the cathode or by pressure with the aid of spring blades.

With reference now to FIG. 4, there now follows a description of an example for mounting the vacuum gauge of the invention and enabling it to be used in the best possible conditions and according to two operating modes, one continuous and the other a sampling mode according to a pulsed mode.

FIG. 4 diagrammatically shows the main elements of the ionization vacuum gauge of FIG. 3, as well as the emissive micropoint cathode of FIG. 2, the elements common to FIGS. 4, 2 and 3 bearing the same reference numbers. The device of FIG. 4 further includes three electric d.c. power units 14, 15 and 16 connected in series between the ground connected to the chamber and the electron collective anode grid 3 as follows:

The power unit 14 makes it possible to positively polarize at Vc the cathodic electrodes 8 with respect to the ground. The power unit 15 polarizes at Vg the extraction grid(s) 11 at a variable positive potential with respect to the cathodic electrodes 8, the potential difference Vg−Vc being 90 V, for example.

The power unit 16 positively polarizes at Va the anode grid 3 with respect to the extraction grids 11 so that the potential difference Va−Vc is the previously defined sought-after value. Between these two power units 15 and 16, the ammeter 17 measures the electronic current collected by the grid 3. The ammeter 18 connected to the collector 4 measures the ionic current flowing to the ground. The measurement of these two electronic and ionic currents allows for measurement of the pressure with the aid of a conventional processing unit 19.

When it is desired to have sampling operation, that is when the measurement is not made continuously but solely during a short period of time, it is possible to synchronize the power unit 15, which shall then be pulsable, and the two ammeters 17 and 18 which shall also be pulsable by means of an external synchronization unit 20. For example, it is possible to limit the measurement to 1 ms with a variable repetition frequency according to requirements, ionization only taking place during the effective time of the measurement.

In an extremely sensitive system, this makes it possible to carry out a pressure measurement and retain control of knowledge of the vacuum without disturbing the latter. Certain physical experiments require that the gauges be stopped as the electronic currents disturb the detectors.

With the embodiment of FIG. 4 and for continuous functioning, a gauge coefficient is obtained of between 25 and 30 mbar$^{-1}$ (for nitrogen), which is roughly twice better than most conventional Bayard-Alpert gauges.

The particular advantage of the mounting shown on FIG. 4 is of having the qualities of the Bayard-Alpert gauges whilst being freed from the problems inherent in the use of a hot cathode. Its main advantages with respect to the performances of a Bayard-Alpert gauge may be summed up as follows:

natural directivity of emission in a solid angle of $\pi/3$ centered on the normal line to the plane of the cathode and emission of electrons with a high initial speed (energy about 100 eV). As a result, centralization of the beam clearly depends less on the positioning of the source in the field.

Moreover, due to their high initial speed, the electrons penetrate into the zone delimited by the grid without being trapped by the latter, which increases the average length of the trajectories of the electrons and thus sensitivity of the gauge.

The high rigidity of the micropoint network moreover ensures an excellent mechanical stability and the cathode used ensures good regularity of the emission. All these characteristics contribute in clearly improving the stability and reproducibility of the measurements:

improvement of emissivity by the surface unit and good natural rigidity. Thus, with an equivalent emission current, the surface of the cathode is smaller than that of the filament, which makes it possible to have the best possible localized source, apart from sampling functioning, the reaction speed of the source makes it possible to halt the measurement should a problem occur (for example, sudden rise in pressure) with effectiveness within an extremely short period of time.

Finally, there is a certain number of advantages directly linked to the replacement of a hot cathode by a cold cathode:

no infrared radiation of the source, which allows for use in a cryogenic atmosphere, no ultraviolet radiation of the source and thus reduction of the Röntgen effect, no creation of species of the same family by heating. The ions are thus created solely via impact with the electrons; the measurement is then more accurate, no filament degassing and thus obtaining a more accurate measurement after ignition, no evaporation of tungsten or pollutants, such as carbon monoxide.

All these phenomena are directly linked to heating of the filament in conventional Bayard-Alpert gauges.

suppression of thorium, a weakly radioactive and chemically dangerous element used for the production of weak electric affinity filaments, that is requiring a relatively weak work function for extracting the electrons. This compound is often used to improve the too weak emissivity of pure tungsten filaments, low consumption, (reduction of consumption by a factor of between 10 and 100).

What is claimed is:

1. Ionization vacuum gauge comprising, in a chamber containing an extremely low pressure atmosphere for which it is desired to measure the ultra-vacuum degree, an electron source cathode; one anode grid for collecting electrons from the cathode; and a collector for collecting ions resulting from the impact of the electrons on the gas molecules of the low pressure atmosphere, the collector being at the center of the chamber and the anode grid being around the collector, wherein the source of electrons is a cold micropoint cathode having cathodic electrodes, micropoints, and an extraction grid and disposed in view of the collector so as to emit electrons through the anode grid toward the ion collector, the collected electrons and ions creating currents which can be processed to measure the vacuum degree.

2. Vacuum gauge according to claim 1, wherein the micropoint cathode includes n cathodic electrodes (n being a whole number) disposed along rows and feeding the micropoints, and m extraction grids (m being a whole number) disposed along columns and isolated from the cathodic electrodes.

3. Vacuum gauge according to claim 2, further comprising means to bring the cathodic electrodes to a potential Vc, the extraction grids to a potential Vg and the anode grid to a potential Va so that the electrons emitted by the source all possess an initial kinetic energy equal to $-e(Vg-Vc)$ able to extend from a minimum value required for the extraction of the electrons to a maximum value less than or equal to $-e(Va-Vc)$, e being the electron charge.

4. Vacuum gauge according to claim 2, wherein the ratio of the distances between firstly the extraction grids and the chamber, and secondly the anode grid and the chamber is equal to the ratio of voltages between firstly the extraction grids and the chamber, and secondly the anode grid and the chamber.

5. Ionization vacuum gauge according to claim 1, wherein the cathodic electrodes for feeding the micropoints are in contact with a resistive film feeding the micropoints.

6. Ionization vacuum gauge according to claim 5, wherein the resistive film is a material selected from the group including indium oxide, tin oxide, iron oxide and doped silicon.

7. Ionization vacuum gauge according to claim 1, further comprising:
- one first d.c. power unit for positively polarizing at potential Vc the cathodic electrodes of the electron source,
- one second d.c. power unit for polarizing at potential Vg the electron extraction grids at a variable potential which is positive with respect to the cathodic electrodes,
- one third d.c. power unit for positively polarizing at potential Va the electron collection anode grid with respect to the electron extraction grid, said three power units being connected in series between the chamber and the electron collection anode grid,
- one first current measuring device mounted between the second power unit and the third power unit so as to measure the electron current,
- one second current measuring device mounted between the ions collector and the chamber so as to measure the ion current,
- processing means connected to the first and second current measuring means so as to calculate the pressure of the ultra-vacuum existing in the chamber on the basis of the values of the electron current and the ion current.

8. Ionization vacuum gauge according to claim 7, further comprising a pulsable circuit connected to synchronize the second power unit and two current measuring devices, also pulsable, for embodying the functioning of the device according to a time-sampling mode.

* * * * *